United States Patent [19]

Sekine et al.

[11] Patent Number: 5,963,148
[45] Date of Patent: Oct. 5, 1999

[54] ROAD SITUATION PERCEIVING SYSTEM

[75] Inventors: Hiroshi Sekine; Nobuyoshi Asanuma, both of Wako, Japan

[73] Assignee: Honda Giken Kogyo Kabushiki Kaisha, Tokyo, Japan

[21] Appl. No.: 08/929,010

[22] Filed: Sep. 8, 1997

Related U.S. Application Data

[63] Continuation of application No. 08/605,948, Feb. 23, 1996, abandoned.

[30] Foreign Application Priority Data

Mar. 23, 1995 [JP] Japan ................................. 7-064587

[51] Int. Cl.$^6$ ....................................................... G08G 1/09
[52] U.S. Cl. .......................... 340/905; 340/995; 348/148
[58] Field of Search .................................. 340/901, 903, 340/904, 905, 990, 995, 937, 435, 601; 348/135, 148, 149, 169; 701/208

[56] References Cited

U.S. PATENT DOCUMENTS

| | | | |
|---|---|---|---|
| 4,694,295 | 9/1987 | Miller et al. | 340/903 |
| 4,899,296 | 2/1990 | Khattak | 364/550 |
| 5,206,811 | 4/1993 | Itoh et al. | 340/990 |
| 5,270,708 | 12/1993 | Kamishima | 340/905 |
| 5,315,295 | 5/1994 | Fujii | 340/905 |
| 5,416,476 | 5/1995 | Rendon | 340/581 |
| 5,461,357 | 10/1995 | Yoshioka et al. | 348/148 |
| 5,541,590 | 7/1996 | Nishio | 340/903 |
| 5,555,312 | 9/1996 | Shima et al. | 340/937 |

FOREIGN PATENT DOCUMENTS

| | | |
|---|---|---|
| 4035979 | 6/1994 | Germany . |
| 6089298 | 5/1985 | Japan . |
| 215890 | 6/1990 | Japan . |
| 660297 | 3/1994 | Japan . |

*Primary Examiner*—Brent A. Swarthout
*Attorney, Agent, or Firm*—Carrier, Blackman & Associates, P.C.; Joseph P. Carrier; William D. Blackman

[57] ABSTRACT

An image of a road area ahead of a vehicle is formed based on road data read from a navigation system, or based on an image shot by a camera means such as a video camera. A temperature profile ahead of the vehicle detected by a temperature detecting means such as an infrared camera is superposed on the image of the road area. As a result, if a low-temperature zone is detected on the road area, it is determined that there is snow or ice existing on the road area, or if a high-temperature zone is detected, it is determined that there is a person or animal existing on the road area, thereby informing a driver by an alarm means or a display means to avoid such an obstruction or hazard. Thus, it is possible to perceive snow, ice, a person and an animal existing on a road ahead of the vehicle without relying on a driver's visual judgment, and to give an alarm so that the driver may timely take an appropriate countermeasure to avoid the obstruction or hazardous situation.

18 Claims, 5 Drawing Sheets

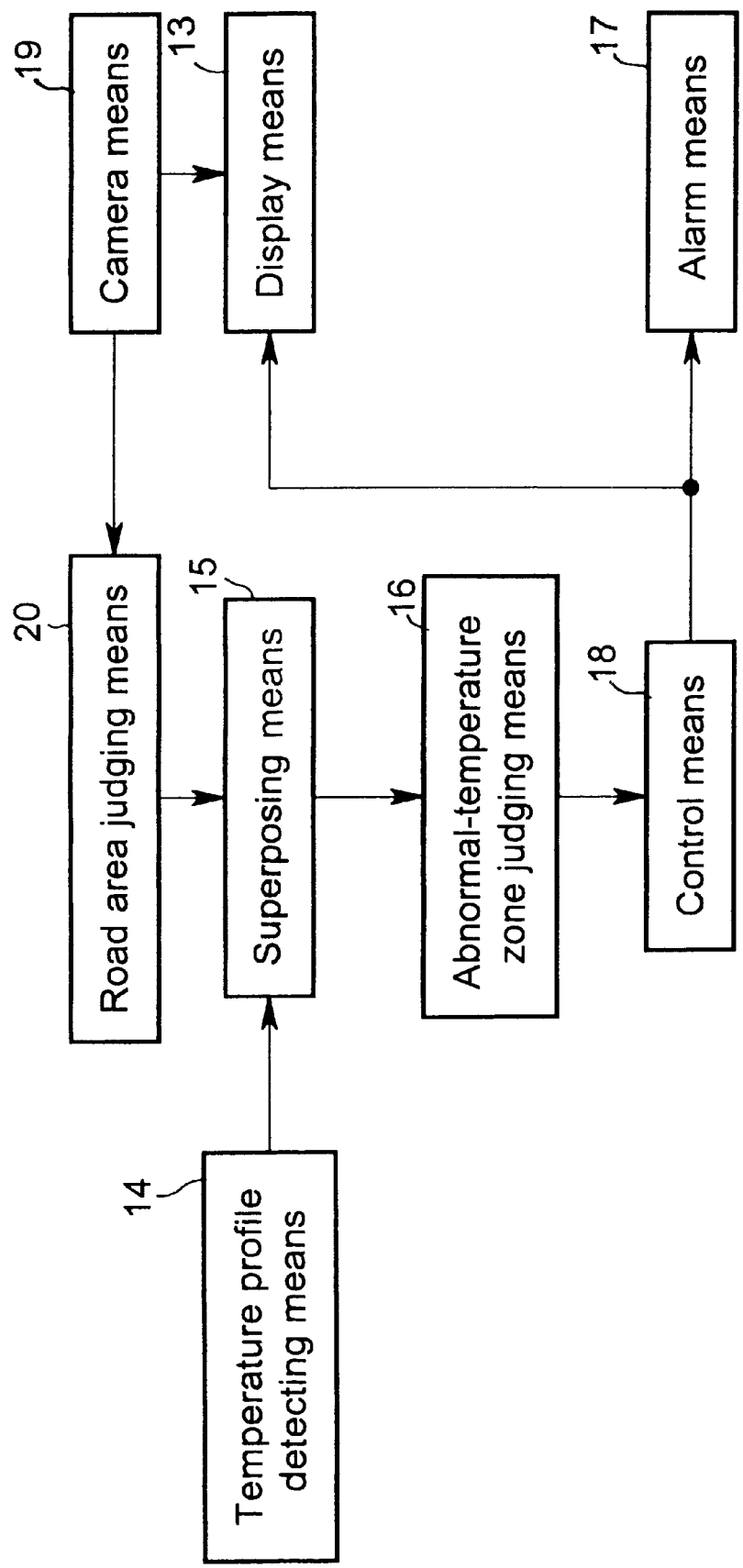

ROAD SITUATION PERCEIVING SYSTEM

This is a file wrapper continuation of prior application Ser. No. 08/605,948 filed Feb. 23, 1996 (now abandoned).

BACKGROUND OF THE INVENTION

1. Field of the Invention

The present invention relates to a road situation perceiving system for perceiving snow, ice, a person, an animal and other impediments and obstacles existing on a road ahead of a subject vehicle without relying on a driver's visual judgment.

2. Description of the Related Art

A technique is known from a Japanese Patent Application Laid-open No. 89298/85, which judges whether it is possible for a subject vehicle to pass through a curve ahead of the subject vehicle in a traveling direction at the current speed by estimating a radius of curvature of the curve based on map data obtained by a navigation system. According to the known technique an alarm is given to a driver when it is determined that it is impossible for the subject vehicle to pass through the curve at the current speed.

In the above known technique, it is possible to perceive the condition of the curve of the road ahead at a position short of the curve to perform a countermeasure such as a speed reduction. However, the above known technique has a limitation in that it is impossible to perceive an iced condition of a road ahead of the subject vehicle or a potentially hazardous situation such as an existence of a walker on a road. Correspondingly, the known technique does not alleviate a burden on the driver in a poor-visibility condition, particularly, in the night or in a fog, of having to perceive such road conditions and obstacles.

SUMMARY OF THE INVENTION

Accordingly, it is an object of the present invention to provide a road situation perceiving system which is capable of perceiving a road situation ahead of the subject vehicle so that an appropriate countermeasure may be performed, if necessary, without relying on a driver's visual judgment.

To achieve the above object, according to a first aspect and feature of the present invention, there is provided a road situation perceiving system, comprising: a map information outputting means for outputting map information as an aggregate of a plurality of coordinate points constituting a map; a subject-vehicle position detecting means for detecting the position of a subject vehicle on the map; a road shape detecting means for detecting a shape of a road ahead of the position of the subject vehicle based on the map information; an image forming means for forming an image of a road area ahead of the vehicle based on the detected road shape; a temperature profile detecting means for detecting a temperature profile ahead of the vehicle; a superposing means for superposing the temperature profile on the image of the road area; an abnormal-temperature zone judging means for judging whether there is an abnormal-temperature zone in the road area; an alarm means for providing an alarm to a driver of the subject vehicle; and a control means for operating the alarm means when it is determined that there is the abnormal-temperature zone in the road area.

With the first feature of the present invention, the image of the road area ahead of the vehicle is formed from the road shape based on the map information, and the temperature profile is superposed on the road area to judge whether there is the abnormal-temperature zone existing in the road area. When there is the abnormal-temperature zone existing, an alarm is given to the vehicle driver.

According to a second aspect and feature of the present invention, there is provided a road situation perceiving system, comprising: a camera means for talking an image ahead of a vehicle; a road area judging means for judging a road area within the image by an image-processing; a temperature profile detecting means for detecting a temperature profile ahead of the vehicle; a superposing means for superposing the temperature profile on the image of the road area; an abnormal-temperature zone judging means for judging whether there is an abnormal-temperature zone in the road area; an alarm means for providing an alarm to a driver of the vehicle; and a control means for operating the alarm means when it is determined that there is the abnormal-temperature zone.

With the second feature of the present invention, the image ahead of the vehicle taken by the camera means is subjected to an image-processing to determine the road area. The temperature profile ahead of the vehicle is superposed on the road area to judge whether there is the abnormal-temperature zone existing in the road area. When there is the abnormal-temperature zone existing in the road area, an alarm is given to the vehicle driver.

According to a third aspect and feature of the present invention, in addition to the first or second feature, the abnormal-temperature zone is judged as a low-temperature zone equal to or lower than a predetermined temperature.

With the third feature of the present invention, it is possible to timely prevent a slipping of the vehicle due to snow or ice by judging the existence of the low-temperature zone ahead of the vehicle equal to or lower than the predetermined temperature, so that an appropriate countermeasure may be timely performed, if necessary.

According to a fourth aspect and feature of the present invention, in addition to the first or second feature, the abnormal-temperature zone is judged as a high-temperature zone equal to or higher than a predetermined temperature.

With the fourth feature of the present invention, it is possible to timely prevent the collision of the vehicle against a person or an animal by judging the existence of the high-temperature zone ahead of the vehicle equal to or higher than the predetermined temperature, so that an appropriate countermeasure may be timely performed, if necessary.

According to a fifth aspect and feature of the present invention, in addition to the first or second feature, the road situation perceiving system further includes a display means for displaying the image of the road area, and when it is determined that there is the abnormal-temperature zone, the control means displays the position of the abnormal-temperature zone on the image of the road area.

With the fifth feature of the present invention, it is possible to reliably inform the driver of the position of an oncoming obstacle or hazardous situation even in the night or in a poor-visibility condition by displaying the abnormal-temperature zone on the image of the road area.

The above and other objects, features and advantages of the invention will become apparent from the following detailed description of preferred embodiments taken in conjunction with the accompanying drawings.

BRIEF DESCRIPTION OF THE DRAWINGS

FIG. 6 is a block diagram similar to FIG. 1, but showing a second embodiment.

DETAILED DESCRIPTION OF THE PREFERRED EMBODIMENTS

The present invention will now be described by way of preferred embodiments with references to the accompanying drawings.

Figure 1:
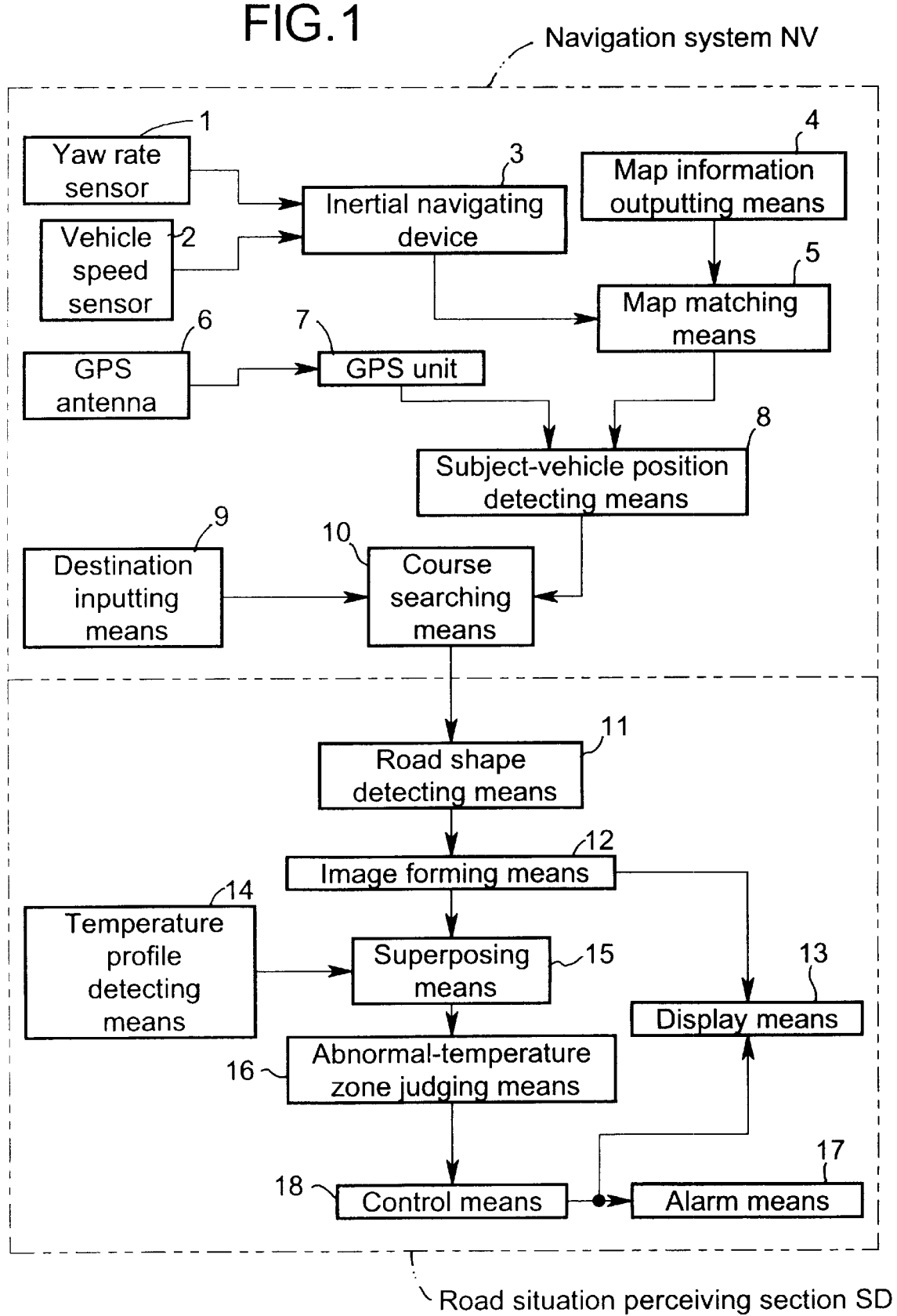
FIG. 1 is a block diagram illustrating the entire arrangement of a road situation perceiving system according to a first embodiment of the present invention.

Referring to FIG. 1, a navigation system NV for a vehicle includes an inertial navigating device 3 to which signals from a yaw rate sensor 1 and a vehicle speed sensor 2 are input, a map information outputting means 4 using an IC card or CD-ROM, and a map matching means 5 for superposing a vehicle travel locus output by the inertial navigating device 3 and a map information output by the map information outputting means 4 on each other. The navigation system NV further preferably includes a GPS unit 7 to which a signal from GPS antenna 6 is input, a subject-vehicle position detecting means 8 for detecting the position of a subject vehicle based on position coordinates output by the map matching means 5 and position coordinates output by the GPS unit 7, and a course searching means 10 for searching a course to a destination based on a destination coordinate signal from a destination input means 9 and subject-vehicle position coordinates output from the subject-vehicle position detecting means 8.

A road situation perceiving section SD includes a road shape detecting means 11 for detecting a road shape in a predetermined range ahead of the position of the subject vehicle from a road searched by the course searching means 10, an image forming means 12 for converting the road shape detected by the road shape detecting means 11 into an image of a road area viewable by a driver of the vehicle, a display means 13 such as a CRT for displaying the image formed by the image forming means 12, and a temperature profile detecting means 14 such as an infrared camera. The road situation perceiving section SD further includes a superposing means 15 for superposing the temperature profile ahead of the subject-vehicle position detected by the temperature profile detecting means 14 on the image formed by the image forming means 12, an abnormal-temperature zone judging means 16 for judging whether there is an abnormal-temperature zone (low temperature or high temperature) within the road area on which the temperature profile has been superposed, and a control means 18 which operates an alarm means 17 such as buzzer, chime, voice and the like and displays the abnormal-temperature zone on the image of the road area displayed on the display means 13, when it is determined that the abnormal-temperature zone exists.

Figure 2:
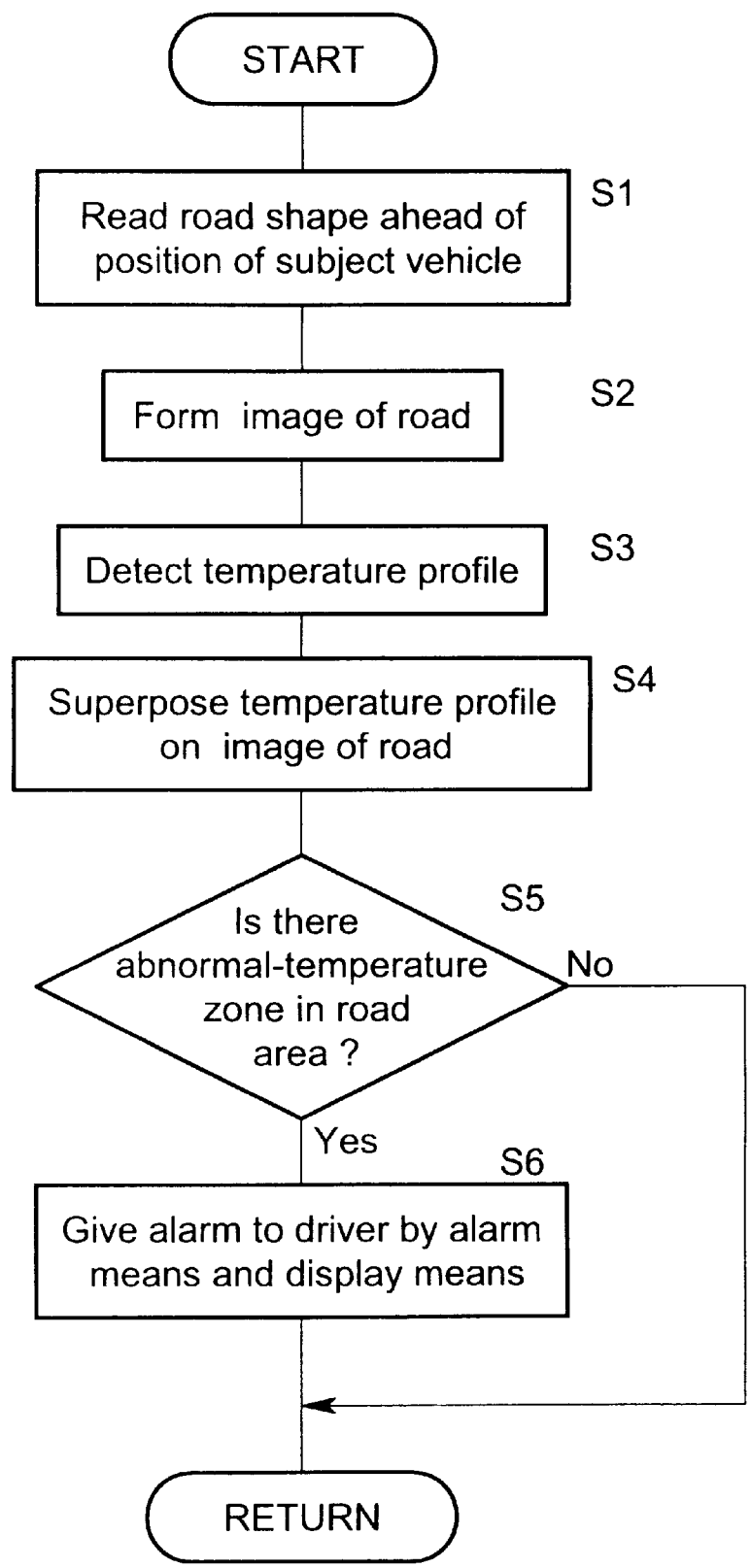
FIG. 2 is a flow chart for explaining the operation of the system of FIG. 1.

The operation of the first embodiment of the present invention will be described below with reference to the flow chart in FIG. 2.

Figure 3:
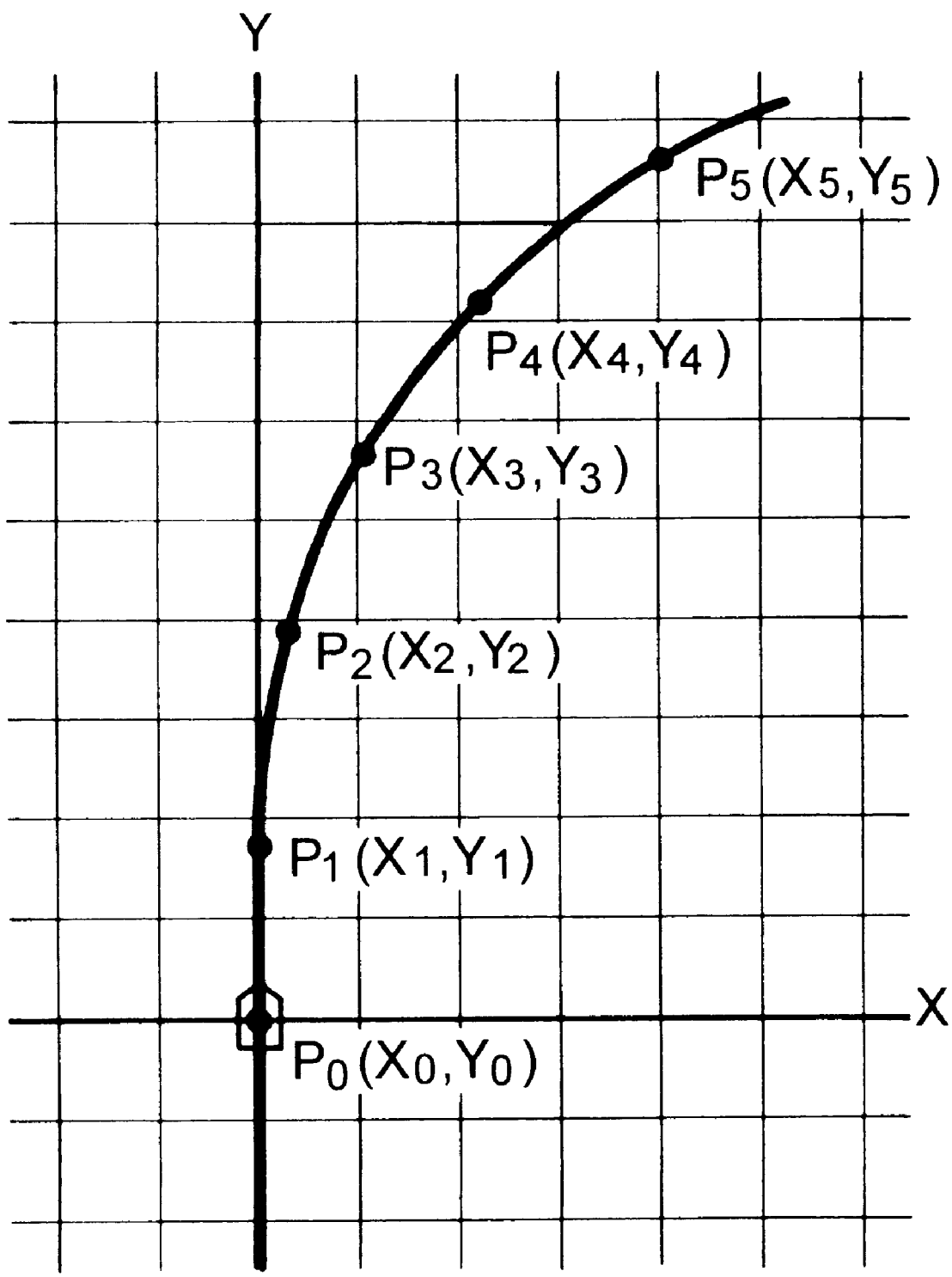
FIG. 3 is a diagram illustrating a road shape read from a course searching means.

First, at step S1, the road shape detecting means 11 reads the road shape in the predetermined range ahead of the subject-vehicle position from the course searching means 10. As shown in FIG. 3, the road shape in the predetermined range ahead of the subject-vehicle position is represented by a plurality of coordinate points $P_O (X_O, Y_O)$, $P_1 (X_1, Y_1)$, $P_2 (X_2, Y_2)$, - - - $P_n (X_n, Y_n)$ in an X-Y rectangular coordinate system having the origin provided by a subject vehicle position $P_O$, a Y-axis in a direction of movement of the vehicle and an X-axis in a direction perpendicular to the direction of movement of the vehicle.

Then, at step S2, the image forming means 12 converts the road shape shown in FIG. 3 into an image of a road area which is actually perceivable visually by a driver. Specifically, the road shape actually perceivable visually by the driver can be obtained by converting the X-Y rectangular coordinate system shown in FIG. 3 into an x-y rectangular coordinate system shown in FIG. 4. At this time, a group of parallel lines (X=const.) in the X-Y rectangular coordinate system is a group of radiate straight lines converging into a point which is infinitely remote from the vehicle, and a group of parallel lines (Y=const.) in the X-Y rectangular coordinate system is a group of parallel lines, the distance between the lines is more reduced at a more remote point in the x-y coordinate system.

Figure 4:
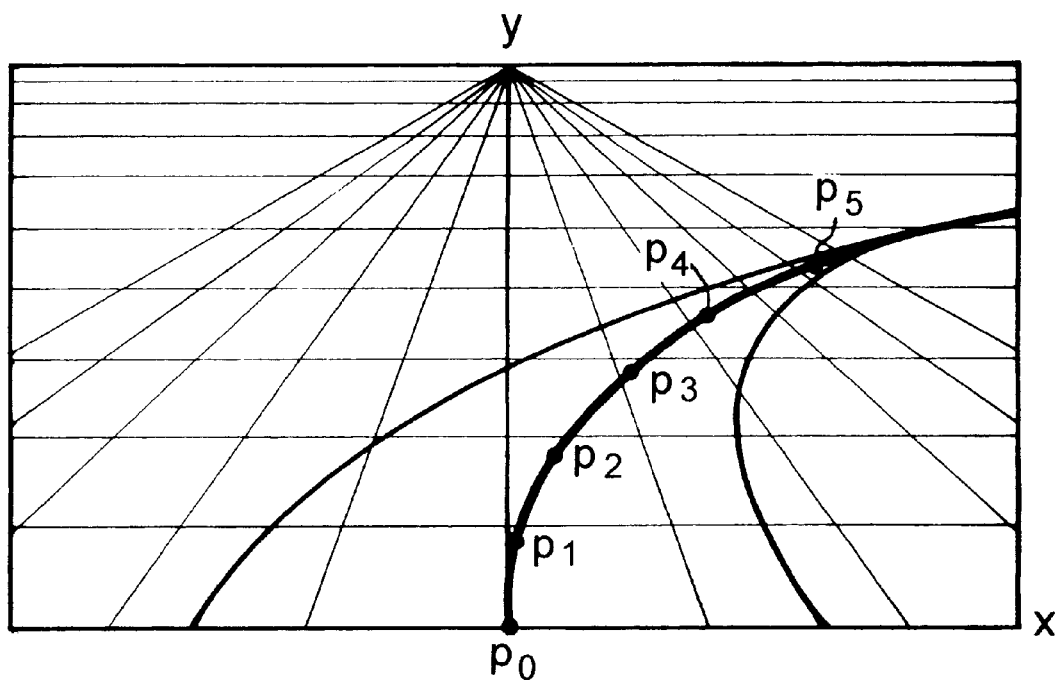
FIG. 4 is a diagram illustrating a method for converting a road shape into an image.
Figure 5:
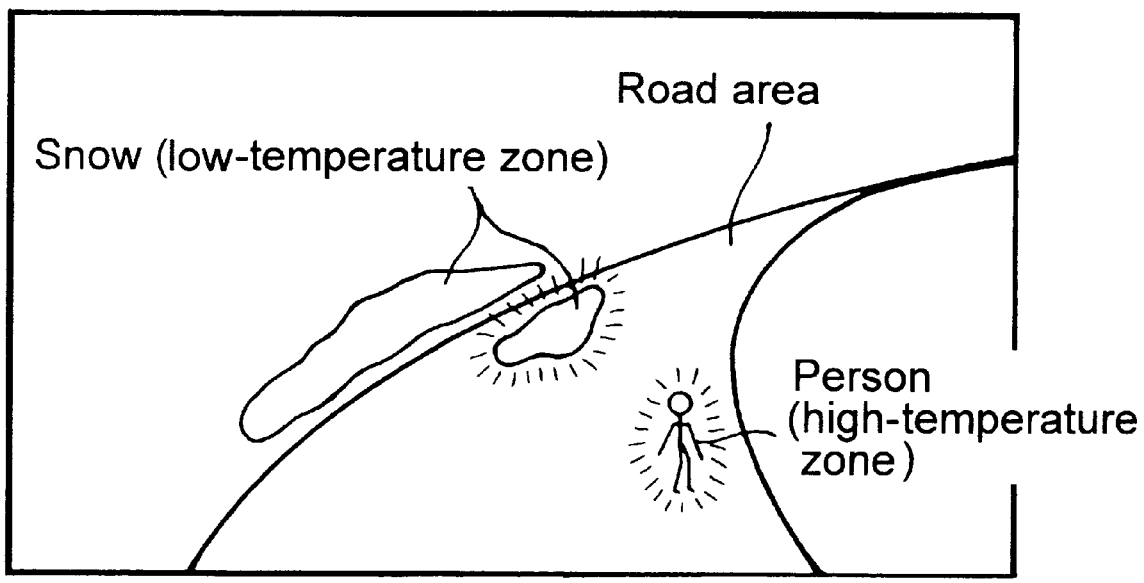
FIG. 5 is an illustration of an image of a road area displayed on a display means.

Thus, the image of the road area actually perceivable visually by the driver can be obtained by converting the coordinate points $P_0 (X_0, Y_0)$, $P_1 (X_1, Y_1)$, $P_2 (X_2, Y_2)$, - - - $P_n (X_n, Y_n)$ representing the road shape in the X-Y rectangular coordinate system into coordinate points $p_0 (x_0, y_0)$, $p_1 (x_1, y_1)$, $p_2 (x_2, y_2)$, - - - $p_n (x_n, y_n)$ in the x-y rectangular coordinate system and adding a road width to these coordinates points (see FIG. 4).

Then, at step S3, a temperature profile ahead of the vehicle is detected by the temperature profile detecting means 14 such as an infrared camera. At step S4, the image of the road area and the temperature profile are superposed on each other by the superposing means 15. If the abnormal-temperature zone judging means 16 determines at step S5 that there is a low-temperature zone equal to or lower than a predetermined temperature, such as caused by snow and ice existing within the road area, or that there is a high-temperature zone equal to or higher than a predetermined temperature, such as caused by a person and animal existing within the road area, the control means 18 operates the alarm means 17 to provide an alarm to the driver such as a warning sound or voice. At the same time, the position of the high-or low-temperature zone detected within the road area is superposed on the road area displayed on the display means 13, such as a CRT, and is indicated by a red or blue or other highly noticeable color flashing.

Thus, even in the night or other poor visibility condition, it is possible for the driver to timely perceive the kind and position of the obstruction or hazard ahead of the driver, thereby permitting the driver to take an advance countermeasure for avoiding the slipping of the vehicle due to snow or ice, or the collision against the person or animal. Especially, the iced state of a wetted road surface which is difficult to visually perceive can be reliably perceived according to the invention at a position short of such road surface and hence, the driver is afforded the time to effect the countermeasure such as a speed-reduction or a steering maneuver for avoiding of the obstruction or hazardous situation.

A second embodiment of the present invention will be described below with reference to FIG. 6.

The second embodiment does not use the navigation system NV and in place thereof, uses a camera means 19 such as a video camera for taking an image ahead of the vehicle. The image ahead of the vehicle taken by the camera means 19 is input to a road area judging means 20, where a road area is judged based on a white line or the like drawn on a road. Thereafter, as in the first embodiment, a temperature profile detected by the temperature profile detecting means 14 is superposed in the image of the road ahead of the vehicle. If there is an abnormal temperature zone existing within the road area, the control means 18 provides an alarm to the driver through the alarm means 17 and/or the display means 13.

According to the second embodiment, an operational effect similar to that in the first embodiment can be achieved even in a vehicle which is not equipped with the navigation system.

Although the presently preferred embodiments of the present invention have been described in detail, the present invention is not limited to the above-embodiments, and it will be apparent to persons of ordinary skill in the art that various modifications may be made without departing from the spirit and scope of the invention defined in claims.

For example, it is possible to perform an automatic speed reduction and/or a steering assist for avoiding the obstruction or hazard in addition to providing the alarm by the alarm means. If the driver is informed of the sort, direction, distance and the like of the obstruction or hazard by a voice, the display is not necessarily required.

What is claimed is:

1. A road situation perceiving system, comprising:

a map information outputting means for outputting map information as an aggregate of a plurality of coordinate points constituting a map;

a subject-vehicle position detecting means for detecting the position of a subject vehicle on the map;

a road shape detecting means for detecting a shape of a road ahead of the position of the subject vehicle based on the map information;

an image forming means for forming an image of a road area ahead of the vehicle based on the detected road shape;

a temperature profile detecting means for detecting a temperature profile ahead of the vehicle;

a superposing means for superposing said temperature profile on said image of the road area;

an abnormal-temperature zone judging means for judging whether there is an abnormal-temperature zone in said road area;

an alarm means for providing an alarm to a driver of the subject vehicle; and a control means for operating said alarm means when it is determined that there is the abnormal-temperature zone.

2. A road situation perceiving system, comprising;

a camera means for taking an image ahead of a vehicle, a road area judging means for judging a road area within said image by an image-processing;

a temperature profile detecting means for detecting a temperature profile ahead of the vehicle;

a superposing means for superposing said temperature profile on said image of said road area;

an abnormal-temperature zone judging means for judging whether there is an abnormal-temperature zone on or above a surface of said road area based on the superposed temperature profile on the image of the road area;

an alarm means for providing an alarm to a driver of the vehicle; and a control means for operating said alarm means when it is determined that there is the abnormal-temperature zone.

3. A road situation perceiving system according to claim 1, wherein said abnormal-temperature zone is a low-temperature zone equal to or lower than a predetermined temperature.

4. A road condition perceiving system according to claim 1, wherein said abnormal-temperature zone is a high-temperature zone equal to or higher than a predetermined temperature.

5. A road situation perceiving system according to claim 1, further including a display means for displaying the image of the road area, and wherein when it is determined that there is the abnormal-temperature zone, said control means displays the position of said abnormal-temperature zone on said image of the road area.

6. A road situation perceiving system according to claim 2, wherein said abnormal-temperature zone is a low-temperature zone equal to or lower than a predetermined temperature zone.

7. A road situation perceiving system according to claim 2, wherein said abnormal-temperature zone is a high-temperature zone equal to or higher than a predetermined temperature.

8. A road situation perceiving system according to claim 2, further including a display means for displaying the image of the road area, and wherein when it is determined that there is the abnormal-temperature zone, said control means displays the position of said abnormal-temperature zone on said image of the road area.

9. A road situation perceiving system according to claim 1, further including means for inputting a destination of the subject vehicle, and said road shape detecting means detects the shape of the road ahead of the position of the subject vehicle additionally based on an input destination of the vehicle.

10. A road situation perceiving system according to claim 2, wherein said camera means takes an image of a space ahead of the vehicle.

11. A road situation perceiving system, comprising:

road image determining means for determining an image of a road area ahead of a subject vehicle;

temperature profile detecting means for detecting a temperature profile of temperatures throughout a space ahead of the subject vehicle;

abnormal-temperature zone judging means for judging abnormal-temperature zones on and above a surface of the road area ahead of the subject vehicle based on outputs from said road image determining means and said temperature profile detecting means; and alarm means for providing an alarm to a driver of the vehicle when it is judged that there is an abnormal-temperature zone in the road area ahead of the subject vehicle;

said abnormal-temperature zone judging means judging whether there is an abnormal-temperature zone by comparing the output from the road image determining means to the output of said temperature profile detecting means; and said abnormal-temperature zone judging means compares said outputs of said road image determining means and said temperature profile detecting means by superposing one of said outputs over the other.

12. A road situation perceiving system according to claim 11, further including:

means for outputting map information as an aggregate of a plurality of coordinate points constituting a map; and subject vehicle position detecting means for detecting a position of the subject vehicle on the map; and said road image determining means determines the image of the road area ahead of the vehicle based on outputs of said map information outputting means and said subject vehicle position detecting means.

13. A road situation perceiving system according to claim 12, further including means for inputting a destination of said subject vehicle, and said road image determining means further determines the image of the road area based on an input destination of said subject vehicle.

14. A road situation perceiving system according to claim 11, wherein said abnormal-temperature zone is a temperature zone outside of a predetermined temperature range.

15. A road situation perceiving system according to claim 11, further including a camera means for taking an image ahead of a vehicle; and said road image determining means forms the image of the road area by an image-processing of said image taken by the camera means.

16. A road situation perceiving system according to claim 11, wherein said temperature profile detecting means comprises an infrared camera.

17. A road situation perceiving system, comprising:

road image determining means for determining an image of a road area ahead of a subject vehicle;

temperature profile detecting means for detecting a temperature profile of a space ahead of the subject vehicle:

abnormal-temperature zone judging means for judging whether there is an abnormal-temperature zone in the road area ahead of the subject vehicle based on outputs from said road image determining means and said temperature profile detecting means;

alarm means for providing an alarm to a driver of the subject vehicle when it is judged that there is the abnormal-temperature zone in the road area ahead of the subject vehicle; and a superposing means for superposing said temperature profile on said image of the road area; and said abnormal-temperature zone judging means judges whether there is the abnormal-temperature zone in said road area based on the superposed temperature profile on said image of the road area.

18. A road situation perceiving system, comprising:

road image determining means for determining an image of a road area ahead of a subject vehicle;

temperature profile detecting means for detecting a temperature profile of a space ahead of the subject vehicle;

abnormal-temperature zone judging means for judging whether there is an abnormal-temperature zone in the road area ahead of the subject vehicle based on outputs from still road image determining means and said temperature profile detecting means;

alarm means for providing an alarm to a driver of the subject vehicle when it is judged that there is the abnormal-temperature zone in the road area ahead of the subject vehicle; and a display means for displaying the image of the road area; and said alarm means displays the position of said abnormal-temperature zone on the display image of the road area when it is determined that there is the abnormal-temperature zone.

* * * * *

UNITED STATES PATENT AND TRADEMARK OFFICE
CERTIFICATE OF CORRECTION

PATENT NO : 5,963,148
DATED : 05 October 1999
INVENTOR(S): Hiroshi Sekine, Nobuyoshi Asanuma It is certified that error appears in the above-identified patent and that said Letters Patent is hereby corrected as shown below:

On the cover page, under "[56] References Cited", correct the number of FOREIGN PATENT DOCUMENT "215890" to --2158900--.

Column 2, line 5, change "talking" to --taking--.

Column 5, line 54 (claim 2, line 2), after "vehicle" change the comma to a semicolon.

Column 7, line 31 (claim 17, line 5), after "vehicle" change the colon to a semicolon.

Column 8, line 21 (claim 18, line 9), change "still" to --said--.

Signed and Sealed this

Eleventh Day of April, 2000

Attest:

Q. TODD DICKINSON

Attesting Officer

Director of Patents and Trademarks